United States Patent
Evans

Patent Number: 6,163,630
Date of Patent: Dec. 19, 2000

[54] METHOD AND APPARATUS FOR PRODUCING TWISTED SOLITONS

[75] Inventor: Alan F. Evans, Beaver Dams, N.Y.

[73] Assignee: Corning Incorporated, Corning, N.Y.

[21] Appl. No.: 08/798,812

[22] Filed: Feb. 12, 1997

Related U.S. Application Data

[60] Provisional application No. 60/011,687, Feb. 15, 1996.

[51] Int. Cl.$^7$ ...................................................... G02B 6/00
[52] U.S. Cl. .............................................................. 385/11
[58] Field of Search ........................ 372/6, 21; 359/159, 359/160; 385/11

[56] References Cited

U.S. PATENT DOCUMENTS

| | | |
|---|---|---|
| 4,509,968 | 4/1985 | Arditty et al. |
| 5,298,047 | 3/1994 | Hart, Jr. et al. |
| 5,418,881 | 5/1995 | Hart, Jr. et al. |
| 5,689,519 | 11/1997 | Fermann et al. .......................... 372/18 |
| 5,778,014 | 7/1998 | Islam ............................................ 372/6 |
| 5,857,040 | 1/1999 | Bigo et al. ................................. 385/15 |
| 5,923,686 | 7/1999 | Fermann et al. .......................... 372/18 |

OTHER PUBLICATIONS

"Polarization effects and nonlinear switching in fiber figure–eight lasers" by Stenz et al, Optics Letters, vol. 19 No. 18 pp. 1462–1464, Sep. 1994.

"Development of Low and High–Birefringent Optical Fibers" by Paune et al, IEEE Journal of Quantum Electronics, vol. QE–18, No. 4, pp. 477–487, Sep. 1994.

S.G. Evangelides et al., "Polarization Multiiplexing with Solitons," Journal of Lightwave Technology, Jan. 1992, vol. 10, No. 1, pp. 28–35.

L.F. Mollenauer et al., "Resistance of solitons to the effects of polarization dispersion in optical fiber," Optics Letters, Nov. 1, 1989, vol. 14, No. 21, pp. 1219–1221.

L.F. Mollenhauer et al., "Birefringence–mediated timing jitter in soliton transmission," Optics Letters, Mar. 15, 1994, vol. 19, No. 6, pp. 375–377.

P.K.A. Wai et al., "Effects of randomly varying birefringence on soliton interactions in optical fibers," Optics Letters, Nov. 15, 1991, vol. 16, No. 22, pp. 1735–1737.

P.K.A. Wai et al., "Stability of solitons in randomly varying birefringent fibers," Optics Letters, Aug. 15, 1991, vol. 16, No. 16, pp. 1231–1233.

A.J. Stentz et al., "Polarization effects and nonlinear switching in fiber figure–eight lasers," Optics Letters, Sep. 15, 1994, vol. 19, No. 18, pp. 1462–1464.

D.N. Payne et al., "Development of Low– and High–Birefringent Optical Fibers," IEEE Journal of Quantum Electronics, Apr. 1982, vol. QE–18, No. 4, pp. 477–487.

*Primary Examiner*—Akm E. Ullah
*Attorney, Agent, or Firm*—William J. Chervenak

[57] ABSTRACT

An optical fiber path in a light amplifying apparatus such as a ring laser, figure eight laser, or nonlinear optical loop mirror, comprises circularly birefringent fiber in order to generate twisted solitons. The light being amplified will follow the pitch of a principle axis of the circularly birefringent fiber as it passes through the optical fiber path. Gain from any other possible polarization lessens as the principle axis polarization constructively interferes upon each round trip. The resulting pulses should have a linear polarization everywhere and the plane of polarization should rotate as a function of space and time. Simultaneous generation of orthogonal, twisted solitons from a single fiber laser source may be accomplished by not placing an optical isolator in the fiber laser optical path.

11 Claims, 1 Drawing Sheet

METHOD AND APPARATUS FOR PRODUCING TWISTED SOLITONS

This application claim benefit of U.S. Provisional No. 60/011,687 filed Feb. 15, 1996.

FIELD OF THE INVENTION

This invention relates generally to fiber optics, and specifically to light amplifying apparatuses such as fiber lasers for producing solitons.

BACKGROUND AND SUMMARY OF THE INVENTION

Soliton communication can overcome most of the system limitations imposed by fiber nonlinearities and dispersion for high bit rates (>10 Gbps) over long distances (>100 km). One residual effect is polarization mode dispersion (PMD), described by the parameter $D_P$ (in ps km$^{-\frac{1}{2}}$) resulting, for solitons, in dispersive wave radiation, pulse reshaping and broadening, increased interaction of adjacent solitons, and timing jitter. This has been discussed in the art, for example by S. G. Evangelides, L. F. Mollenauer, J. P. Gordon and N. S. Bergano, "Polarization multiplexing with solitons," J. Lightwave Technol. 10(1), 28–35 (1992), L. F. Mollenauer, K. Smith and J. P. Gordon, "Resistance of solitons to the effects of polarization dispersion in optical fiber," Opt. Letts. 14(21),1219 (1989), L. F. Mollenhauer and J. P. Gordon, "Birefringence-mediated timing jitter in soliton transmission," Opt. Letts. 19(6), 375–377 (1994), P. K. A. Wai, C. R. Menyuk and H. H. Chen, "Effects of randomly varying birefringence on soliton interactions in optical fibers," Opt. Letts. 16(22), 1735–1737 (1991), and P. K. A. Wai, C. R. Menyuk and H. H. Chen, "Stability of solitons in randomly varying birefringent fibers," Opt. Letts. 16(16), 1231–1233 (1991).

These problems are greatly reduced if $D_P<0.3$ D, where D is the group velocity dispersion, as discussed by Mollenauer, Smith and Gordon, "Resistance of solitons to the effects of polarization dispersion in optical fiber. " Polarization of the data is also an issue for polarization division multiplexing (PDM). PDM can effectively double the data rate by using orthogonally polarized data channels which is possible with solitons because they retain a single state of polarization over transoceanic distances even in the presence of amplified spontaneous emission noise. On the other hand, PDM is not possible with linear, "non-return to zero" (NRZ) systems because of the depolarizing effects of random birefringence, as discussed by Evangelides et al., "Polarization multiplexing with solitons. "

It was unknown until the present invention that replacing the step index or dispersion-shifted fiber of standard fiber ring or figure eight laser configurations with circularly birefringent fiber could produce the desired twisted solitons. As an added advantage, the control of polarization in the birefringent laser cavity should improve its performance over polarization insensitive cavities where small changes in birefringence (externally-induced) can lead to dramatic changes in the output of the laser, as discussed by A. J. Stentz and R. W. Boyd, "Effects of polarization on mode locking in fiber figure-eight lasers," Opt. Letts. 19(18), 1462–1464 (1994).

One object of the present invention is to construct an optical amplifier that can be incorporated within a fiber laser for generating circularly polarized, twisted solitons that could easily couple to circularly polarizing transmission fiber or other fiber.

Another object of the present invention is to achieve control of polarization in an optical amplifier or fiber laser's birefringent laser cavity, in order to improve its performance over polarization insensitive cavities, in which small, externally-induced changes in birefringence can lead to dramatic changes in the output of the laser.

Still another object of the present invention is to achieve simultaneous generation of orthogonal, twisted solitons from an optical amplifier or single fiber laser source.

These and other objects are achieved by the present invention, which comprises a method and associated apparatus for using circularly birefringent fiber for generating circularly polarized, twisted solitons that could easily couple to circularly polarizing transmission fiber. Example embodiments for use of the invention, including a ring laser, figure eight laser, and nonlinear optical loop mirror, are taught.

BRIEF DESCRIPTION OF THE DRAWING

For a fuller understanding of the nature and objects of the invention, reference should be made to the following detailed description of two possible architectures for practicing the invention, read in connection with the accompanying drawings, in which.

DETAILED DESCRIPTION OF THE SELECTED EMBODIMENTS

Figure 1A:
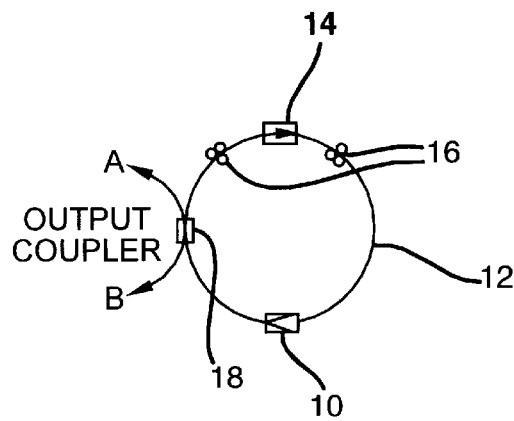
FIG. 1(a) is a diagram of a twisted soliton producing ring laser according to the invention.
Figure 1B:
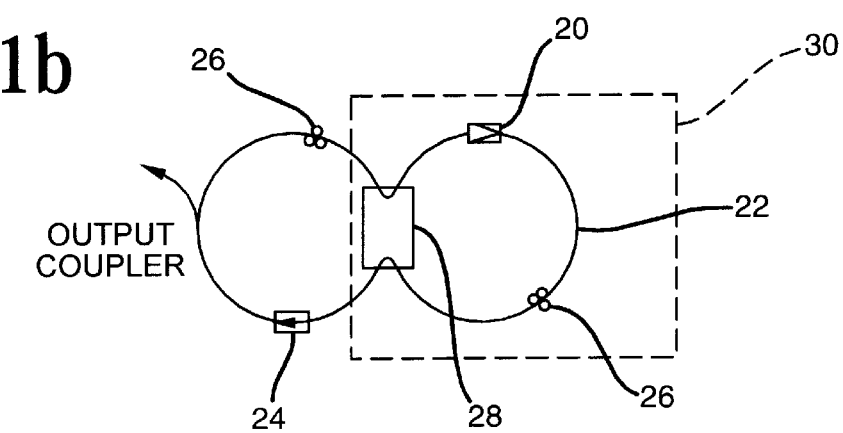
FIG. 1(b) is a diagram of a twisted soliton producing figure eight laser according to the invention.

FIGS. 1(a) and 1(b) show the configuration of two representative fiber lasers. FIG. 1(a) is a ring laser and FIG. 1(b) is known as a figure-eight laser. Passively-mode-locked lasers are shown. For active mode-locking, phase or intensity modulation would be required. Amplifiers 10, 20 may comprise active fiber doped with a rare earth such as erbium (Er$^+$) or praseodymium, or be any other type of optical amplifiers known in the art. Instead of step index or dispersion-shifted fiber of standard configurations, the fiber rings of the embodiments of FIGS. 1(a) and 1(b) comprise birefringent fiber 12, 22. In either type of laser according to the invention, either or both the amplifier 10, 20 and the birefringent fiber 12, 22 will comprise circularly birefringent fiber, defined as optical fiber that has a finite birefringence, the axis of which is twisted or turned along the length of the fiber. In the preferred embodiments of the lasers of (respectively) FIGS. 1(a) and 1(b), the entire lengths of the birefringent fiber 12, 22 will be circularly birefringent fiber, and amplifiers 10, 20 will comprise lengths of the circularly birefringent fiber 12, 22 that are active. Thus, while in order to produce the twisted solitons the invention will always comprise an optical amplifier, and the invention will always comprise circularly birefringent fiber, the optical amplifier recited in the claims may, and indeed preferably (although not necessarily) will, comprise some of the recited circularly birefringent fiber, and perhaps even all of the recited circularly birefringent fiber.

Other components of the lasers, such as 50:50 coupler 28, are as usual in the art, and may include isolators 14, 24, and polarization controllers 16, 26, as desired. These components could also, although not necessarily, comprise circularly birefringent fiber. Simultaneous generation of orthogonal, twisted solitons propagating in opposite directions from the single fiber laser source may be accomplished by removing the isolator from the fiber laser optical path.

Figure 1C:
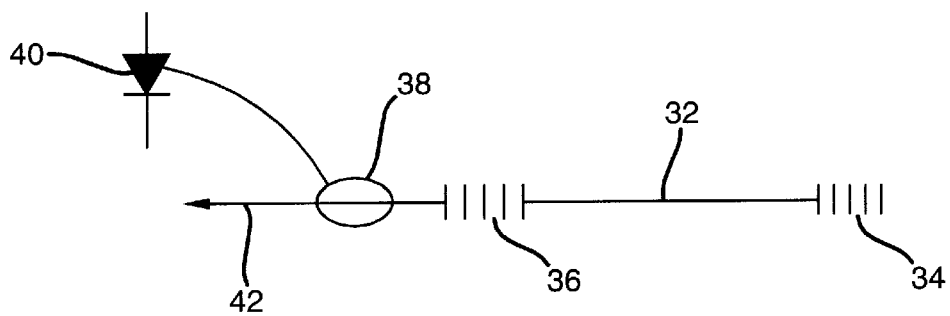
FIG. 1(c) is a diagram of a twisted soliton producing Fabry-Perot laser according to the invention.

The invention can also be accomplished in Fabry-Perot type laser configurations, where the fiber is straight-deployed in a linear configuration and reflecting mirrors or fiber gratings at the fiber ends provide feedback. FIG. 1(c) illustrates one possible embodiment of such, with a pump laser diode 40 pumping light through a wavelength division multiplexed fiber coupler 38 and output grating 36 into active circularly birefringent fiber 32. The light reflects off a photoreflective Bragg fiber grating 34 acting as a high reflectivity grating, and produces twisted solitons at 42.

The active circularly birefringent fiber used in embodiments of the invention can be, for example, doped with rare earth elements such as erbium (Er$^+$) or praseodymium. Erbium doping provides for lasing activity near 1550 nm (nm=nanometer=10Å), while praseodymium doping provides for lasing activity near 1300 nm.

Birefringence of the birefringent fiber 12, 22, 32 may be in the 1 to 5 picosecond per meter range, although other ranges may be useable as well. Fiber birefringence needs to be sufficient to avoid mixing of the orthogonal polarization modes. Circularly birefringent fiber can be formed by physically twisting birefringent fiber during its placement in whatever apparatus it is to be used in, by twisting the preform or fiber during the drawing process (spun fiber), or possibly even photorefractively.

Examples of the above methods are generally well known in the art. For example, U.S. Pat. Nos. 5,298,047 and 5,418,881, incorporated herein by reference, teach techniques and apparatus whereby torque can be applied by roller means causing the guide rollers to oscillate about an axis which is substantially perpendicular to the fiber drawing direction. U.S. Pat. No. 4,509,968, also incorporated herein by reference, provides a device and method for providing a unidirectional spin or twist in the circularly birefringent fiber. Forming circularly birefringent fiber by twisting the preform during the drawing process is also described by D. N. Payne, A. J. Barlow and J. J. Hansen, "Development of low- and high-birefringent optical fibers," IEEE J. Quantum Electron. QE-18(4), 477 (1982).

In the ring laser configuration of FIG. 1(a), the fiber loop provides feedback to the amplifier. The ring will lase once the gain provided by the amplifier overcomes the loss in the rest of the loop, and will preferentially lase in the mode of lowest loss. Accordingly, one expects that if the birefringent fiber has a certain pitch to its principle axis, the light will follow that pitch and rob gain from any other possible polarization as it constructively interferes upon each round trip. The laser also minimizes the round trip loss by self mode-locking to form transform-limited picosecond pulses verses lasing continuous wave (CW). Therefore, pulses should form that have a linear polarization everywhere and the plane of polarization should rotate as a function of space and time.

Figure 2:
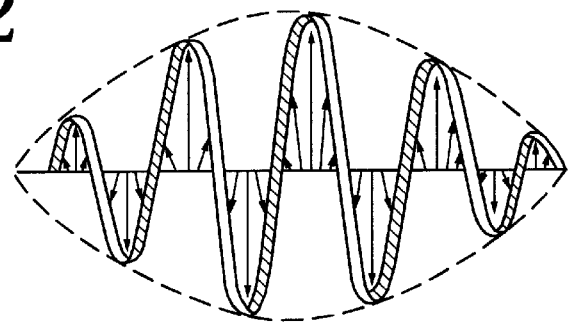
FIG. 2 is a pseudo-three dimensional depiction of an example of a pulse profile of a twisted soliton, showing amplitude and polarization.

FIG. 2 shows the amplitude and polarization of such a pulse profile which by definition is a twisted soliton. Another useful property of circularly birefringent fiber ring lasers may occur if the isolator that forces unidirectional operation in a conventional configuration is removed, so that the lasing ring is unobstructed by an isolator. This means that the entire optical path of the lasing ring is unobstructed by an isolator, so that the light travelling in each direction can travel many times around the lasing ring without being blocked by an isolator. By the same arguments as above, one expects counter-propagating, orthogonally polarized circular solitons. Looking at the output coupler 18 of FIG. 1(a), the laser could simultaneously furnish right- and left-hand twisted solitons for PDM from the output ports A and B, respectively.

The situation of a figure eight fiber laser may be more complicated. The loop 30 on the right hand side of FIG. 1(b), known as a nonlinear amplifying loop mirror (NALM), acts as an artificial saturable absorber for polarization insensitive fiber. It has a transmission function (clockwise output into the left hand loop—i.e., the output that in the figure goes immediately into the isolator) of $T=\frac{1}{2}(1+\alpha \cos(\phi_{NL}+\phi_B))$, where the contrast factor $\alpha(0\leq\alpha<1)$ and the phase bias $\phi_B$ are functions of the input polarization, and birefringence within the loop mirror and $\phi_{NL}$ is a result of asymmetric placement of the amplifier. One might expect that a similar expression exists for a circularly birefringent loop mirror with different values for $\alpha$ and $\phi_B$ but they both become functions of space and time. The loop mirror may still act as a saturable absorber for passive mode-locked pulsed operation. If not, it may display unique behavior applicable to pulse shaping, noise suppression or optical switching or demultiplexing.

For most embodiments, it is recommended that circularly birefringent fiber be used for as much of the optical path as possible within the laser or loop mirror, and that the circularly birefringent fiber have a uniform twist rate, but the invention may be carried out using non-uniformly twisted circularly birefringent fiber, as well. The laser or loop mirror has an optical path defined by fiber comprising circularly birefringent fiber. In "loop" configurations, the axis of birefringence within the fiber should make a whole number of 360° twists along the entirety of its optical path, so that the ends of the fiber of the ring "line up" when joined together to complete the ring. In this way, light of the correct spatial polarization variation can propagate around the ring or straight fiber section to constructively interfere upon each round trip. Less desirably, phase shifting plates, polarization controllers, or other such means could also be used to make the polarization twists line up without having the birefringent fiber make a whole number of 360° twists. This may be necessary in practice since knowledge of exact number of twists in manufactured fiber can be difficult.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A method for producing twisted solitons, comprising the steps of:

providing an optical fiber path, for transporting light, comprising circularly birefringent fiber;

forming at least a portion of said circularly birefringent fiber into a fiber laser; and, using an optical amplifier, amplifying light passing through the optical fiber path.

2. A method for producing twisted solitons as recited in claim 1, wherein said step of forming includes the step of inducing birefringence in said birefringent fiber by imparting to said birefringent fiber a uniform twist rate.

3. A method for producing twisted solitons as recited in claim 1, wherein said step of providing includes the step of comprising within said optical fiber path circularly birefringent fiber having a birefringence of between 1 and 5 pico-seconds, inclusive.

4. A method for producing twisted solitons as recited in claim 1, additionally comprising the step of assembling circularly birefringent fiber having birefringence of between 1 and 5 picoseconds per meter, inclusive, as part of a lasing ring of a ring laser.

5. A method for producing twisted solitons as recited in claim 1, additionally comprising the step of assembling circularly birefringent fiber having birefringence of between 1 and 5 picoseconds per meter, inclusive, as part of a lasing ring of a figure-eight laser.

6. A method for producing twisted solitons as recited in claim 1, additionally comprising the step of assembling circularly birefringent fiber having birefringence of between 1 and 5 picoseconds per meter, inclusive, as part of a lasing ring of a nonlinear optical loop mirror.

7. A method for producing twisted solitons as recited in claim 1, additionally comprising the step of assembling circularly birefringent fiber having birefringence of between 1 and 5 picoseconds per meter, inclusive, as part of a Fabry-Perot laser.

8. A method for producing twisted solitons as recited in claim 1 wherein said forming step includes forming said at least a portion of said circularly birefringent fiber into a ring laser.

9. A method for producing twisted solitons as recited in claim 8 wherein said forming step includes forming said ring laser as a portion of a non-linear optical loop mirror.

10. A method for producing twisted solitons as recited in claim 1 wherein said forming step includes forming said at least a portion of said circularly birefringent fiber into a figure-eight laser.

11. A method for producing twisted as recited in claim 1 wherein said forming step includes forming said at least a portion of said circularly birefringent fiber into a Fabry-Perot laser.

* * * * *

UNITED STATES PATENT AND TRADEMARK OFFICE
CERTIFICATE OF CORRECTION

PATENT NO. : 6,163,630 Page 1 of 1
DATED : December 19, 2000
INVENTOR(S) : Alan F. Evans It is certified that error appears in the above-identified patent and that said Letters Patent is hereby corrected as shown below:

<u>Column 6,</u>
Line 15, after the word "twisted" please insert -- solitons --

Signed and Sealed this

Second Day of July, 2002

Attest:

Attesting Officer

JAMES E. ROGAN
*Director of the United States Patent and Trademark Office*